Patented May 12, 1936

2,040,207

UNITED STATES PATENT OFFICE 2,040,207

PROCESS FOR THE PRODUCTION OF CONDENSATION PRODUCTS

Wilhelm Kraus, Vienna, Austria

No Drawing. Application January 26, 1934, Serial No. 708,509. In Germany January 27, 1933

7 Claims. (Cl. 260—3)

This invention relates to a process for the production of condensation products from phenols and urea or mixtures of urea and other compounds which react with formaldehyde. The products obtained by the new process are distinguished by lightness of color and fastness to light.

It is a recognized fact that condensation products obtained from phenols possess colour of their own, and that for this reason it is impossible to obtain white or light coloured products of this order. The presence of this inherent colouring is due to the employment of hexamethylenetetramine, which is required for the hardening of the phenolic condensation products, and which it is hardly possible to dispense with. Further, phenolic condensation products are not particularly stable from a photochemical point of view, this deficiency being attributable to the fact that the known phenolic condensation products still possess free residual valencies to which the oxygen of the atmosphere becomes attached, more particularly under the influence of light.

The lack of fastness to light is traceable to the particular molecular structure of the phenolic condensation products. The employment (known per se) of hexamethylenetetramine as a hardening agent for novolacs affords insight into the nature of this structure. When hexamethylenetetramine is added to a novolac the reaction remains acid, even if more hexamethylenetetramine be employed than is necessary for the neutralization of the acid present. Nevertheless there is a quantity of hexamethylenetetramine which suffices to render the resin alkaline. The quantity of hexamethylenetetramine capable of bringing about alkaline reaction is not always of the same order of magnitude. It varies with the nature of the acid employed for the condensation, with the duration of the heating, and with other factors. A novolac produced from one mol. of condensable phenol may sometimes require the addition of one mol. or even more of hexamethylenetetramine to bring about alkaline reaction. Hexamethylenetetramine possesses three double linkages at the end which are capable of reaction, and which act as free residual valencies. The novolac product apparently constitutes a reservoir of unsaturated linkages, or free residual valencies which become saturated by the free residual valencies of the hexamethylenetetramine. The hexamethylenetetramine enters into the structure of the molecule and loses its alkaline properties. The building up of the molecule takes place in a peculiar manner in the presence of hexamethylenetetramine. Owing to the three proximate double linkages of hexamethylenetetramine there are evolved, in lieu of simple molecular chains, multidimensional reticulate structures of very high molecular weight which are capable of solidifying very rapidly in the hot press, to masses of exceptional hardness.

Apart from this very considerable advantage, the use of hexamethylenetetramine also involves the above-mentioned disadvantage that it gives rise to discoloration.

It has now been established by the present inventor that light colored products which are fast to light can be obtained from phenols, in spite of the employment of hexamethylenetetramine, provided all the free residual valencies of the phenol condensation products be linked to other free residual valencies pertaining to light colored compounds which are fast to light. As compounds of this nature for the purpose in view, urea-formaldehyde condensation products have proved to be particularly well suited.

In accordance with the invention the procedure is such that phenols, urea or mixtures of urea and other compounds which react with formaldehyde, and hexamethylenetetramine or compounds of an action similar to that of hexamethylenetetramine, are caused to react in an acid medium, the supplementary substances used in addition to phenol being employed in such large quantities that all the free residual valencies of the phenolic condensation products become saturated.

The process can be carried out in the following ways:

(1) Phenols and formaldehyde are condensed in an acid medium to novolacs incapable of being hardened and known per se. Urea, formaldehyde, and hexamethylenetetramine are then condensed independently, and likewise in an acid medium. By condensation of the urea with employment of hexamethylenetetramine molecules of multidimensional structure with free residual valencies are obtained. On the bringing together of the two separately produced condensation products, the deleterious residual valencies of the novolac become linked up, and thereby rendered innocuous, with the formation of very highly molecular, extensively ramified compounds.

If particular value be attached to the obtaining of masses which are highly resistant to the effects of light, care must be taken that all the free residual valencies of the novolac be supplemented by the hexamethylenetetramine condensation products.

As a technical method for ascertaining the required condition in which all the free residual valencies are linked up, the following has proved to be a suitable test: To an aliquot portion of the mass of the condensation product formed after the mixing there is added slightly more hexamethylenetetramine than is necessary to neutralize the condensation acid present. If all the free residual valencies have been taken up, this addition will bring about a state of alkalinity. If free residual valencies be still present, the added hexamethylenetetramine enters into the composition of the molecule, and the reaction of the product remains acid. If the reaction remains acid it is therefore desirable to add further quantities of the hexamethylenetetramine condensation products. This procedure is continued until the above described test shows that all the residual valencies have become saturated.

The term "novolac" is here taken to comprise the known products which result from the acid condensation of phenols and formaldehyde, and which remain indefinitely capable of being melted. The process for the manufacturing of novolac can be carried to the point at which the resin separates out of the aqueous solution; condensation can also be continued until novolacs which are soluble in water are produced.

The combining of the novolac with the hexamethylenetetramine condensation product must be carried out with the observance of certain conditions. The condensation products are first mixed together, after which the mixed product is preferably subjected to a maturing process without the application of heat, that is to say left to stand, possibly under agitation, until the new condensation product (linkage product) has become evolved from the mixture. If the mixed product were to be heated to high temperatures immediately after mixing, each component would polymerize independently, and dark coloured masses would result which are difficult to harden. After the formation of the new condensation product, the water of the formaldehyde and the water of reaction is preferably distilled off under reduced pressure, and the resulting mass mixed with cellulose or other fillers in suitable mixing machines. The procedure followed can also be such that both the novolac and also the hexamethylenetetramine product are each freed of water independently of each other, by distillation under reduced pressure and at as low a temperature as possible. The distilled masses are then brought together and left to interact, without the application of heat, until the new condensation product has become formed.

(2) Phenols, urea, formaldehyde, and hexamethylenetetramine are condensed together with the application of heat, in acid media, at hydrogen ion concentrations (measured in the initial formaldehyde) higher than a pH of 3. The quantity of hexamethylenetetramine used is such that the reaction mixture is either acid from the outset or becomes acid after the application of heat.

It is conducive to the attainment of the object in view, to produce non-saturated urea condensation products which in their turn are required to become linked up, during the condensation process, to the non-saturated phenol condensation products present. The formation of the non-saturated urea condensates has been found by the present inventor to be a function of the hydrogen ion concentration. Whereas in an alkaline medium there are formed exclusively saturated methylol compounds and at a pH less than 3 mainly methylol compounds, there are formed at a pH greater than 3 mainly non-saturated methylene compounds. These conditions hold good also when phenols, urea, and hexamethylenetetramine are employed from the commencement of the reaction, for which reason when this method of working is adopted the condensation is carried out at a pH greater than 3.

The condensation is continued, with the application of heat, until resins just begin to separate out of the hot solution, which resins can be distilled, preferably in vacuo, as soon as they have separated out, to form more or less thinly liquid resins, with the elimination of the whole or almost the whole of the water. The reaction can be carried out at or below boiling temperature, or under increased pressure above the normal boiling temperature.

It is perfectly possible to add to the reaction mixture, during condensation, with the retention of acidity of reaction, further quantities of hexamethylenetetramine, either at once or in portions.

(3) All the initial substances are condensed, with the elimination of heat, in an acid medium, at hydrogen ion concentrations (measured in the initial formaldehyde) higher than that corresponding to a pH of 3. In this method of carrying out the process there may only be introduced at the outset so much hexamethylenetetramine that the reaction mixture is of acid reaction from the outset. The remaining quantities of hexamethylenetetramine are added later, either at once or in portions, with retention of the acidity of reaction.

The heat elimination is effected by cooling. The cooling action must be reinforced, more particularly in large scale working, by mechanical measures such as stirring.

With this method also the molecular linkages described under (2) are brought about.

The ratio between phenols and formaldehyde, in the case of each of the described methods of working, must be such that for one molecule of phenols there is employed approximately one molecule of formaldehyde. The precise amounts used, however, can fall short of or exceed these proportions. For one molecule of urea there should be employed approximately one molecule or more of formaldehyde. The quantites of hexamethylenetetramine used are determined by the requirement that the reaction remain acid. Definite quantative limits cannot be given for the amount of hexamethylenetetramine to be used.

As phenols there may be employed phenol, the isomeric cresols, possibly in suitable mixtures, and multivalent phenols.

In place of urea alone there can also be employed mixtures containing other compounds which react with formaldehyde. Examples of such compounds are thiourea, urethanes, and various acid amides, such as formamide, acetamide, oxamide.

In place of hexamethylenetetramine itself, there can also be employed suitable quantities of ammonia and formaldehyde, in which case hexamethylenetetramine is evolved in the reaction solution. In the same way as hexamethylenetetramine, nitrogen-formaldehyde compounds of a similar nature, which likewise possess free residual valencies, can also be employed, either instead of or in addition to hexamethylenetetramine. Compounds of this nature are, for example, the formaldehyde compounds of hydrazin and the mono- and dialkyl compounds of ammonia. Whenever hexamethylenetetramine is mentioned in the course of this specification, this term is intended to include also compounds of this nature.

If non-saturated compounds should become evolved afresh in the course of the condensation, further quantities of hexamethylenetetramine can be introduced, care being taken, however, to ensure that the acidity of the reaction is not cancelled thereby.

As acid catalysts there can be employed inorganic and organic acids, compounds which yield acid by cleavage, salts of acid reaction, either separately or in commixture, provided the dissociation constants of the catalysts permit of the attainment of the pH value prescribed for the process. The addition can be effected at once or in portions. It is advisable to dissolve the acid catalyst in formaldehyde before the other initial substances are added.

A particular advantage of the present process consists in the fact that the reaction product obtained thereby, in contract to the products obtainable by known processes working at the same hydrogen ion concentration, is capable of dehydration at reduced or normal pressure, and that it is permanently capable of absorbing filling matter, since it remains viscously plastic. The masses obtainable from phenols and urea at hydrogen ion concentrations of the order employed in accordance with the present invention, without the addition of hexamethylenetetramine, become so hard after being heated for quite a short time, that they are no longer capable of being dehydrated and of being mixed with filling materials.

In many cases, and more particularly when strong volatile acids are employed for the condensation, it would appear to be advantageous to remove the acids, since they would otherwise tend to attack the press molds. This can be effected by washing, partial or complete neutralization, dialysis, or other similar measures. The salts resulting from neutralization can likewise be eliminated by washing or dialysis. For pressing there are employed either the cleansed products as they are or the cleansed products reacidulated with non-volatile acids. The above instructions as regards the elimination of the acids present apply equally when phenol and urea are each condensed independently of the other, in which case the elimination is effected in the above described manner either before or after the mixing together of the separately produced condensation products.

The resulting resins are mixed with filling and fibrous materials at any desired stage of the manufacturing process, and preferably after the distillation for the removal of water.

It is advisable to subject the resins to preliminary polymerization, before pressing, until the flowing properties required for pressing have been established. This purpose is served either by storing at temperatures between 50 and 120° C. or by mechanical treatment on heated calenders. In order to obtain pressed articles of as light a color as possible it is necessary to avoid pressing at temperatures which set up reaction causing alkaline discoloration accompanied by decomposition phenomena. In general, temperatures of about 160° C. should not be exceeded in pressing. The duration of pressing should not be too prolonged when high temperatures are employed.

The condensation products according to the present invention can also be cast, and yield in this case also articles of excellent properties.

*Examples*

1. 94 parts by weight of phenol, 81 parts by weight of 40 vol.% formaldehyde, and 1 part by weight of oxalic acid are boiled for half an hour under reflux. A novolac separates out in the form of a thinly viscous resin. 60 parts by weight of urea, 122 parts by weight of 40 vol.% formaldehyde, and 0.25 part by weight of oxalic acid are left to stand for five hours under cooling. The temperature should not rise above 7° C. Into the thickly pasty mass produced there is introduced the solution of 5 parts by weight of hexamethylenetetramine in a small quantity of water, after which the mixture is left to stand for some length of time, for example for 12-24 hours. This urea condensate is mixed with the phenolic condensate in the cold. The mixed product is left to stand for 20-24 hours, mixed with fibrous and filling materials, and dried by heating in vacuo. Before pressing, the mass is worked on calender rollers until it has acquired the necessary degree of polymerization.

2. The novolac is prepared in the manner given in Example 1. The production of the urea condensate is effected by heating 120 parts by weight of urea, 244 parts by weight of 40 vol.% formaldehyde, 9.3 parts by weight of hexamethylenetetramine, and 1 part by weight of oxalic acid, at 65° C. for one hour. The cooled urea condensate is mixed with the cold novolac, whereupon there clearly occurs a thickening of the thinly liquid novolac. The combined mass is left to stand for 24 hours, and mixed with filling materials. The drying and further working up of the fibrous mass is carried out as outlined in Example 1.

3. The production of the novolac is effected as in Example 1. The urea condensate is produced in the following manner:—54 parts by weight of urea, 7.6 parts by weight of thiourea, 122 parts by weight of 40 vol.% formaldehyde, and 0.8 part by weight of oxalic acid are left to stand for 17 hours under cooling. The temperature should not rise above 14° C. Into the thinly pasty solution there are introduced 8 parts by weight of hexamethylenetetramine. Finally, both condensates are combined, and left to stand for 15 hours. The product is then distilled in vacuo, and further treated in the manner described in Example 1.

4. The novolac is prepared in the following manner:—94 parts by weight of phenol, 81 parts by weight of 40 vol.% formaldehyde, and 1 part by weight of oxalic acid are heated for a quarter of an hour under reflux. The solution remains perfectly clear; no separating out of resin occurs. Production of the urea condensate:—60 parts by weight of urea, 122 parts by weight of 40 vol.% formaldehyde, 5 parts by weight of hexamethylenetetramine, and 0.5 part by weight of oxalic acid are heated at 65° C. for three-quarters of an hour to an hour. Into the still somewhat warm novolac solution there is introduced the cooled urea condensate, whereupon cooling is at once effected. The mixture is at first perfectly clear, but becomes somewhat turbid on standing. The mixed solution is mixed with filling materials, left to stand for at least 24 hours before being dried in vacuo.

5. The novolac is produced in accordance with Example 1, and the urea condensate in accordance with Example 4. The two condensates, after having been cooled, are brought together, left to stand for 24 hours without the application of heat, and then distilled off in vacuo. The distilled mass of strongly acid reaction is neutralized, either before or after commixture with fibrous matter, by the addition of alcoholic caustic potash solution or other alkaline agent, until the same reacts but very weakly acid.

6. A novolac produced in accordance with Example 1 is distilled in vacuo. The urea condensate is produced in accordance with Example 4, neutralized, and concentrated in vacuo. The two concentrated masses thus obtained are intimately mixed together, left to stand for 24 hours without the application of heat, and further worked up in the manner specified in Example 1.

7. Production of the novolac:—94 parts by weight of phenol, 50 parts by weight of 40 vol.% formaldehyde, and 1 part by weight of oxalic acid are boiled under reflux until resin separates out. Production of the urea condensate:—120 parts by weight of urea, 194 parts by weight of 40 vol.% formaldehyde, 21 parts by weight of hexamethylenetetramine, and 5 parts by weight of oxalic acid are heated to 60–70° C. until the mass reacts acid. The two condensates are mixed together, left to stand under agitation for 24 hours, mixed with fibrous matter, and dried.

8. 46 parts by weight of phenol, 30 parts by weight of urea, 4.7 parts by weight of hexamethylenetetramine, 1.5 parts by weight of oxalic acid, and 101 parts by weight of 40 vol.% formaldehyde are heated under reflux ½–1 hour, until an oleaginous, thinly viscous, colourless resin has just separated out in the hot solution. The reaction of the solution and of the separated out resin is strongly acid. The thinly viscous resin is concentrated as far as possible, whereupon there results a perfectly colorless resin which is as clear as glass and thinly viscous in the heat, and which is then mixed with cellulose and either stored at temperatures between 50 and 90 degrees centigrade, or treated on hot calender rollers at temperatures between 100 and 120° C., until it possesses the following properties required for pressing.

9. 46 parts by weight of phenol, 27 parts by weight of urea, 3.8 parts by weight of thiourea, 4.7 parts by weight of hexamethylenetetramine, 1.5 parts by weight of oxalic acid, and 101 parts by weight of 40 vol.% formaldehyde are heated under reflux for ½–1 hour, until the resin is just beginning to separate out. The further treatment is in accordance with Example 8. In this case also there results a resin which is perfectly colourless, as clear as glass, and of acid reaction.

10. 46 parts by weight of phenol, 30 parts by weight of urea, 4.7 parts by weight of hexamethylenetetramine, 1.5 parts by weight of oxalic acid, and 101 parts by weight of 40 vol.% formaldehyde are heated under reflux for 20–30 minutes. Into the hot acidly reacting solution there are introduced 2.3 parts by weight of hexamethylenetetramine dissolved in a small quantity of water, with the retention of acid reaction. The resulting resin is as clear as glass, transparent, and readily fusible in the heat. The further treatment is according to Example 8.

11. 46 parts by weight of phenol, 30 parts by weight of urea, 4 parts by weight of hexamethylenetetramine, 1.5 parts by volume of 44 vol.% hydrochloric acid, and 101 parts by weight of 40 vol.% formaldehyde are heated for ½–1 hour at 60° C. There results a thinly viscous resin solution which is slightly turbid in the cold and of strongly acid reaction, without deposits. The solution is left to stand for some hours in the cold, after which it is neutralized with an alcoholic caustic potash solution until the acid reaction is very weak. It can also be completely neutralized and subsequently acidulated with a small quantity of oxalic acid. Finally, the resin is precipitated out by the addition of water, and washed, followed by concentrating in vacuo and further treatment in accordance with Example 8. The resulting products are perfectly clear.

12. 46 parts by weight of phenol, 45 parts by weight of urea, 5 parts by weight of hexamethylenetetramine, 1.7 parts by weight of oxalic acid, and 132 parts by weight of 40 vol.% formaldehyde are condensed.

13. 46 parts by weight of phenol, 60 parts by weight of urea, 9.2 parts by weight of hexamethylenetetramine, 3 parts by weight of oxalic acid, and 154 parts by weight of 40 vol.% formaldehyde are heated under reflux until a resin separates out. The resin is further treated in accordance with Example 8.

14. 46 parts by weight of phenol, 30 parts by weight of urea, 2.3 parts by weight of hexamethylenetetramine, and 101 parts by weight of 40 vol.% formaldehyde containing 3 parts by volume of 44 vol.% hydrochloric acid are mixed together under very vigorous cooling and under constant stirring. The temperature should not exceed 30° C. After the mass has been left to stand for some hours there are added 3 parts by weight of hexamethylenetetramine dissolved in a small quantity of water, under stirring. The acid reaction is retained. The mass is then concentrated in vacuo, mixed with fibrous and filling material, and treated on heated calender rollers until it has acquired the flowing properties required for pressing.

15. 54 parts by weight of metacresol, 27 parts by weight of urea, 3.8 parts by weight of thiourea, 2.5 parts by weight of hexamethylenetetramine, and 101 parts by weight of 40 vol.% formaldehyde containing 3 parts by volume of 44 vol.% hydrochloric acid are treated as specified in Example 14. The exothermic reaction is less violent than that occurring in the case of Example 14. After the mass has been left to stand for 20 hours, 3 parts by weight of hexamethylenetetramine are added, after which neutralization is effected by means of an alcoholic caustic potash solution, followed by distillation. The concentrated resin receives the addition of 1 to 3 parts by weight of oxalic acid dissolved in spirit, mixed with cellulose, and further treated in accordance with Example 14.

16. 46 parts by weight of phenol, 27 parts by weight of urea, 4.4 parts by weight of urethane, 2.5 parts by weight of hexamethylenetetramine, and 101 parts by weight of 40 vol.% formaldehyde containing 3 parts by volume of 44 vol.% hydrochloric acid are condensed in the manner specified in Example 1. The resulting mass is then mixed with filling and fibrous materials, and dried in vacuo. The further treatment is the same as that given in Example 1. Instead of urethane, a corresponding quantity of acetamide, formamide, oxamide, or of any other acid amide can be employed.

What I claim is:

1. Process for the manufacture of condensation products from urea, hexamethylenetetramine, phenols, and formaldehyde, characterized by causing urea, hexamethylenetetramine, a phenol, and an acidulated aqueous solution of formaldehyde having a pH less than 3 to react together, the proportion of hexamethylenetetramine being substantially higher than would be necessary for the formation of a salt of hexamethylenetetramine with the acid used, the condensation being continued until condensation products of acid reaction are formed.

2. Process for the manufacture of condensation products from urea, hexamethylenetetramine, phenols, and formaldehyde, characterized by first causing urea, hexamethylenetetramine, and an acidulated aqueous solution of formaldehyde having a pH less than 3 to react together, the proportion of hexamethylenetetramine being substantially higher than would be necessary for the formation of a salt of hexamethylenetetramine with the acid used, the condensation being continued until condensation products of acid reaction are formed, whereupon the thus obtained reaction products of acid reaction are caused to react with a phenol in the form of a novolac.

3. Process according to claim 1, wherein instead of urea a mixture of urea with other acid amides selected from the group consisting of thiourea, urethane, formamide, acetamide, oxamide is used.

4. Process as claimed in claim 2, wherein instead of urea a mixture of urea with other acid amides selected from the group consisting of thiourea, urethane, formamide, acetamide, oxamide is used.

5. Process for the manufacture of condensation products from urea, hexamethylenetetramine, phenols, and formaldehyde, characterized by the feature that a previously formed novolac of acid reaction is caused to react with at least an equimolecular proportion of a urea-hexamethylenetetramine-formaldehyde condensation product of acid reaction, the latter being obtained by causing hexamethylenetetramine to react with urea and an acidulated aqueous solution of formaldehyde having a pH less than 3, the proportion of hexamethylenetetramine being substantially greater than is necessary for the formation of a hexamethylenetetramine salt with the acid used, and the condensation of the mixture of hexamethylenetetramine, urea, and formaldehyde being continued until acid reaction is attained.

6. An article of manufacture comprising a hard, light colored, light fast, water resistant condensation product of urea, hexamethylenetetramine, a phenol, and formaldehyde, obtained by causing urea, hexamethylenetetramine, a phenol and an acidulated aqueous solution of formaldehyde having a pH less than 3 to react together, the proportion of hexamethylenetetramine being substantially higher than would be necessary for the formation of a salt of hexamethylenetetramine with the acid used, the condensation being continued until condensation products of acid reaction are formed.

7. A condensation product obtained by the process claimed in claim 2.

WILHELM KRAUS.